(12) United States Patent  
Knepp (10) Patent No.: US 9,266,662 B1  
(45) Date of Patent: Feb. 23, 2016

(54) BULK FIBER DISPENSER (71) Applicant: Darrell Knepp, Sarasota, FL (US)

(72) Inventor: Darrell Knepp, Sarasota, FL (US)

(73) Assignee: VM Fiber Feeders Inc., Sarasota, FL (US)

( * ) Notice: Subject to any disclaimer, the term of this patent is extended or adjusted under 35 U.S.C. 154(b) by 222 days.

(21) Appl. No.: 14/023,929

(22) Filed: Sep. 11, 2013

Related U.S. Application Data (60) Provisional application No. 61/699,511, filed on Sep. 11, 2012.

(51) Int. Cl.
*B65D 83/00* (2006.01)
*B65G 65/48* (2006.01)
*D01G 23/04* (2006.01)

(52) U.S. Cl.
CPC ........ *B65D 83/0083* (2013.01); *B65G 65/4809* (2013.01); *D01G 23/045* (2013.01)

(58) Field of Classification Search
CPC . B65G 65/4809; D01G 23/045; G01G 11/08; G01G 11/083; G01G 11/12; G01G 13/00; G01G 13/20; G01G 13/22; B65D 83/0083
USPC ............. 222/168, 333, 414, 504, 58, 63
See application file for complete search history.

(56) References Cited

U.S. PATENT DOCUMENTS

| | | | |
|---|---|---|---|
| 2,650,745 A * | 9/1953 | Oberwortman | 222/410 |
| 2,848,143 A * | 8/1958 | Gandrud | 222/242 |
| 3,648,896 A * | 3/1972 | Baltz | 222/168 |
| 3,885,774 A | 5/1975 | Harris et al. | |
| 4,003,502 A * | 1/1977 | Barcell | 222/168 |
| 4,023,706 A | 5/1977 | Dearlove et al. | |
| 4,106,706 A * | 8/1978 | Burrows | 241/186.2 |
| 4,142,689 A * | 3/1979 | Kemp et al. | 241/247 |
| 4,524,886 A * | 6/1985 | Wilson et al. | 222/58 |
| 4,812,100 A * | 3/1989 | Lonardi et al. | 414/199 |
| 5,215,268 A * | 6/1993 | Houle et al. | 241/186.4 |
| 5,833,092 A * | 11/1998 | Godfrey et al. | 222/168 |
| 5,931,610 A | 8/1999 | Rixom et al. | |
| 5,947,645 A | 9/1999 | Rixom et al. | |
| 6,354,465 B2 * | 3/2002 | Bell et al. | 222/58 |
| 6,550,362 B1 | 4/2003 | Galinat et al. | |
| 7,736,569 B2 | 6/2010 | Baur et al. | |
| 2004/0255429 A1 | 12/2004 | Clausen | |

FOREIGN PATENT DOCUMENTS

WO 2009014952 A1 1/2009

* cited by examiner

*Primary Examiner* — Nicholas J Weiss (74) *Attorney, Agent, or Firm* — Nilay J. Choksi; Smith & Hopen, P.A.

(57) ABSTRACT

A dispenser for even or patterned distribution of fibrous or other additive into a base material, such as concrete. The dispenser includes a rotating hopper that contains the fiber, such that the fiber rotates with the hopper along a vertical line of axis. The dispenser further includes a rake along the base of the hopper, where the rake captures the fiber from the bottom of the hopper and filters or directs the fiber into an exit chute for the delivery system. The rake includes an array of flat and curved flanges that facilitate guidance of the fiber to the exit chute. The hopper can be positioned on one or more load cells that monitor the amount of fiber being dispensed by weight, in order to increase or decrease rotation of the hopper and rake, thus controlling amount of fiber distributed.

18 Claims, 11 Drawing Sheets

BULK FIBER DISPENSER

BACKGROUND OF THE INVENTION

1. Field of the Invention

This invention relates, generally, to the manufacturing and application of fiber-reinforced concrete, and asphalt. More particularly, it relates to an apparatus for and method of metering and dispensing bulk fibers or other additives into a base material, such as concrete, asphalt, and plastics.

2. Description of the Prior Art

Metering and dispensing bulk fibers is a difficult process. One conventional manner of dispending fiber into concrete is simply by hand. However, fiber is typically very lightweight and tends to bind, bridge, cling, and "ball-up" during the dispensing operation.

Certain mechanistic fiber dispensers do exist in the prior art. Examples include U.S. Pat. No. 7,736,569 to Baur et al.; U.S. Pat. No. 5,947,645 to Ives et al.; U.S. Patent Pub. No. 2004/025542 to Clausen; U.S. Pat. No. 5,931,610 to Ives et al.; PCT Pub. No. WO2009014952 to Ramnarine; U.S. Pat. No. 6,550,362 to Galinat et al.; U.S. Pat. No. 3,885,774 to Clipston et al.; and U.S. Pat. No. 4,023,706 to Dearlove et al. However, each of the foregoing references are very complex and have many moving parts, thus overcomplicating the manufacture, use and maintenance of the apparatus. Additionally, the foregoing references can be inaccurate and importantly fail to provide an even distribution of fiber in the concrete.

Accordingly, what is needed is a simplified bulk fiber dispenser for metering and dispensing bulk fibers accurately, efficiently, and evenly. However, in view of the art considered as a whole at the time the present invention was made, it was not obvious to those of ordinary skill how the art could be advanced.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for a more accurate, easier to use, and less complicated bulk fiber or additive dispenser is now met by a new, useful and nonobvious invention.

In an embodiment, the current invention is a dispenser for an even or patterned distribution of an additive into a base material. The dispenser includes a hopper, a base, an elongate rake, a support frame, a delivery system, and a power source and motor. The hopper has a substantially impermeable outer wall and a substantially hollow interior for receiving the additive. The hopper has an open bottom with a predetermined diameter. The hopper also has a bottom edge that is received by the base, such that the hopper can rotate about its vertical line of axis within the base. A window is disposed within the base, and a rotatable, elongate rake is positioned and secured within the window. The rake has a plurality of flanges that filter the additive and guide the additive through the window. The support frame is positioned under the base and supports the base and hopper. A delivery system is positioned at least partially under the window. The delivery system receives the additive when the additive exits downwardly through the window. A power source and motor(s) are electrically coupled to the dispenser for powering the dispenser.

The additive may be a fibrous material.

The base material may be cement or asphalt.

The plurality of flanges may include planar flanges near the midpoint of the elongate rake and curved flanges near the ends of the elongate rake. The curved flanges can be angled to urge the additive toward the planar flanges and to urge the additive downwardly through the window of the base. The planar flanges urge the additive downwardly through the window of the base. The rake is partially enclosed by an impermeable housing. This housing helps ensure that the additive is urged toward the longitudinal center (midpoint) of the elongate rake. A chute or funnel may be positioned at the lower center of the rake housing to allow the additive to exit the section of the apparatus supported by load cells (the weighed section of the apparatus). The delivery system would be positioned beneath the exit chute, separated by an air gap. The air gap would prevent any load transfer between the weighed section of the apparatus and the ground, thus ensuring that the load cells accurately measure the weight of the section of the apparatus supported by load cells.

The dispenser may further include a load cell coupled to the base for measuring the weight of the additive remaining in the hopper as the additive exits the hopper into the delivery system. The load cell is electronically coupled to the motor, such that the load cell can control the rotation of the hopper and the rake to increase or decrease output of the additive through the window.

The delivery system may include an exit chute beneath the window, so that the additive exiting the window of the base would be directed into the exit chute. The delivery system may further include a blower in communication with the exit chute, such that the additive exiting the exit chute are directed into the blower for distribution into the base material.

The dispenser may further include a deflecting plate positioned along a longitudinal edge of the window for guiding the additive to the rake and through the window.

The base may include a base ring along its periphery. The base ring would have a top edge that is higher than the bottom edge of the hopper when the base and hopper are assembled. If a base ring is present, a plurality of rollers may be positioned along an inner periphery of the base ring. The rollers further secure the hopper during rotation of the hopper. Still further, the rollers may be idler gears. Additionally, the roller may include a vertical roller that rotates about its horizontal line of axis and a horizontal roller that rotates about its vertical line of axis. If these vertical and horizontal rollers are present, there may be sets of rollers, where there is one horizontal roller positioned on each side of a vertical roller, thus forming a set of three (3) rollers. These sets of rollers would be disposed equidistant from one another in multiple places along the inner periphery of the base ring.

The dispenser may further include a belt and pulley system coupled to and in communication with the hopper and the motor to facilitate the rotation of the roller.

The dispenser may further include a control panel in electrical communication with the motor to control rotation of the hopper and rake.

The window may have an end disposed at a peripheral edge of the base and may extend toward the center point of the base. The window and rake would thus have a length similar to the radius of the base or hopper.

The flanges may be structured in a manner that when the flanges reach the top of their rotation, only then are they fully disposed within the interior of the hopper.

In a separate embodiment, the current invention is a dispenser for an even or patterned distribution of an additive into a base material. The dispenser includes a hopper, a base, a support frame, a delivery system, a power source and motor, and a load cell. The hopper has a substantially impermeable outer wall and a substantially hollow interior for receiving the additive. The hopper has an open bottom with a predetermined diameter. The hopper also has a bottom edge that is received by the base, such that the hopper can rotate about its vertical line of axis within the base. A window is disposed within the base. The support frame is positioned under the base and supports the base and hopper. A delivery system is positioned at least partially under the window. The delivery system receives the additive when the additive exits downwardly through the window. A power source and motor are electrically coupled to the dispenser for powering the dispenser. The load cell is coupled to the base for measuring the weight of the additive remaining in the hopper as the additive exits the hopper into the delivery system. The load cell is electrically coupled to the motor, such that the load cell can control the rotation of the hopper and the rake to increase or decrease output of the additive through the window.

The additive may be a fibrous material.

The base material may be cement or asphalt.

The dispenser may further include an elongate rake positioned and secured within the window. The rake would have an array of flat and curved flanges that guide the additive through the window.

The dispenser may further include a plurality of rollers positioned along the inner periphery of the base. The plurality of rollers would be idler gears that serve the purpose of further securing the hopper during rotation of the hopper.

The dispenser may further include a control panel in electrical communication with the load cell and the motor to control rotation of the hopper and rake.

In a separate embodiment, the current invention is a dispenser for an even or patterned distribution of an additive into a cement or asphalt. The dispenser includes a hopper, a base, an elongate rake, a support frame, a delivery system, a power source and motor, and a load cell. The hopper has a substantially impermeable outer wall and a substantially hollow interior for receiving the additive. The hopper has an open bottom with a predetermined diameter. The hopper also has a bottom edge that is received by the base, such that the hopper can rotate about its vertical line of axis within the base. The base includes a base ring disposed along the periphery of the base. A plurality of idler gears are positioned along the inner periphery of the base ring. The idler gears include a vertical roller that rotates about its horizontal line of axis and a horizontal roller that rotates about its vertical line of axis. To rotate the hopper, a pulley and belt system is coupled to and in communication with the roller and motor. A window is disposed within the base, and a rotatable, elongate rake is positioned and secured within the window. The window has an end disposed at a peripheral edge of the base and extends toward the center point of the base. The window and rake would thus have a length similar to the radius of base. The rake has a plurality of flanges that selectively filter the additive and guide the additive through the window. The flanges include planar flanges near the midpoint of the elongate rake and curved flanges near the ends of the elongate rake. The curved flanges are angled to urge the additive toward the planar flanges and to urge the additive downwardly through the window of the base. The planar flanges urge the additive downwardly through the window of the base. The flanges are structured in a manner that when the flanges reach the top of their rotation, only then are they fully disposed within the interior of the hopper. The support frame is positioned under the base and supports the base and hopper. A delivery system is positioned at least partially under the window. The delivery system includes an exit chute that receives the additive when the additive exits downwardly through the window. A power source and motor are electrically coupled to the dispenser for powering the dispenser. The load cell is coupled to the base for measuring the weight of the additive remaining in the hopper as the additive exits the hopper into the delivery system. The load cell is electrically coupled to the motor, such that the load cell can control the rotation of the hopper and the rake to increase or decrease output of the additive through the window.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

In an embodiment, the current invention is a novel apparatus for and methodology of metering and dispensing fiber from a hopper into a delivery system. The apparatus and methodology can be used for a variety of applications, including, but not limited to, concrete, asphalt, paper, or other industries where fibrous or other additive is needed to be dispensed evenly into a base material (e.g., concrete, plastic, composite, etc.) to enhance qualities, such as structural integrity, of the base material.

In an embodiment, the current invention is a bulk fiber dispenser. The dispenser comprises a rotating hopper that contains fiber rotating with the hopper and a rake-type structure coupled to and at least partially disposed within the hopper. The portion of the rake-type structure within the hopper can selectively filter fiber out of the hopper and into a funnel, such that that filtered fiber can be distributed to a delivery system for output. The rake-type structure can be mechanically coupled to a motor to allow the structure to automatically function.

The dispenser may further include one or more load cells disposed underneath the hopper. The load cells can monitor the weight of the fiber within the hopper, so that they can direct the hopper to automatically increase or decrease speed of rotation to maintain a consistent flow of fiber out of the hopper.

In another embodiment, the current invention is a method of dispensing fiber. The method comprises the steps of coupling a rake-type structure to a rotating hopper that contains fiber. The rake includes at least a portion disposed within the hopper as well, so that the rake can selectively filter or direct certain fiber out of the hopper and into an exit chute connected to the hopper, such that that filtered fiber can be distributed to a delivery system for output.

The method may further include the steps of disposing one or more load cells underneath the hopper and allowing the one or more load cells to monitor the weight of the fiber. The load cells can then direct the hopper to automatically increase or decrease speed of rotation to maintain a consistent flow of fiber out of the hopper.

Figure 1:
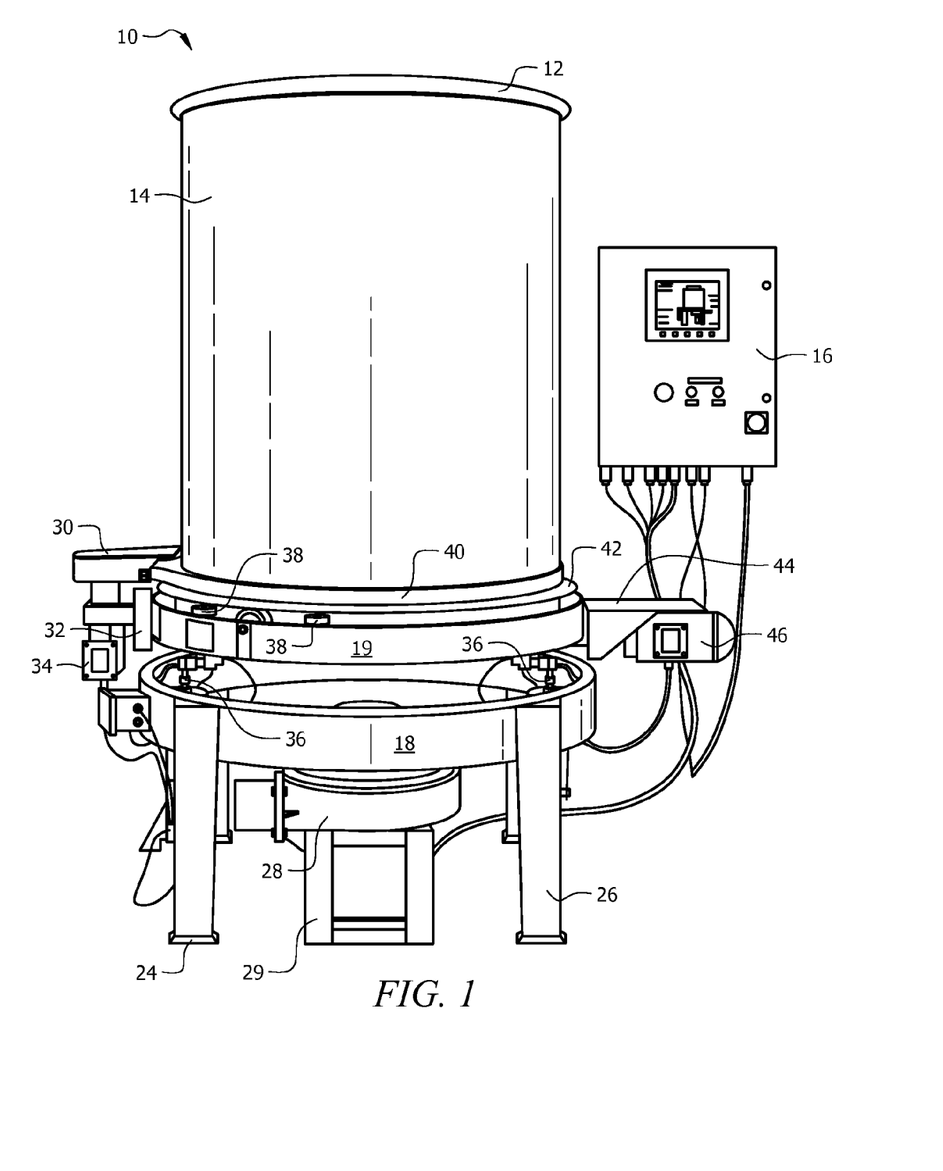
FIG. 1 is a front view of an apparatus for dispensing an additive into a base material.
Figure 2:
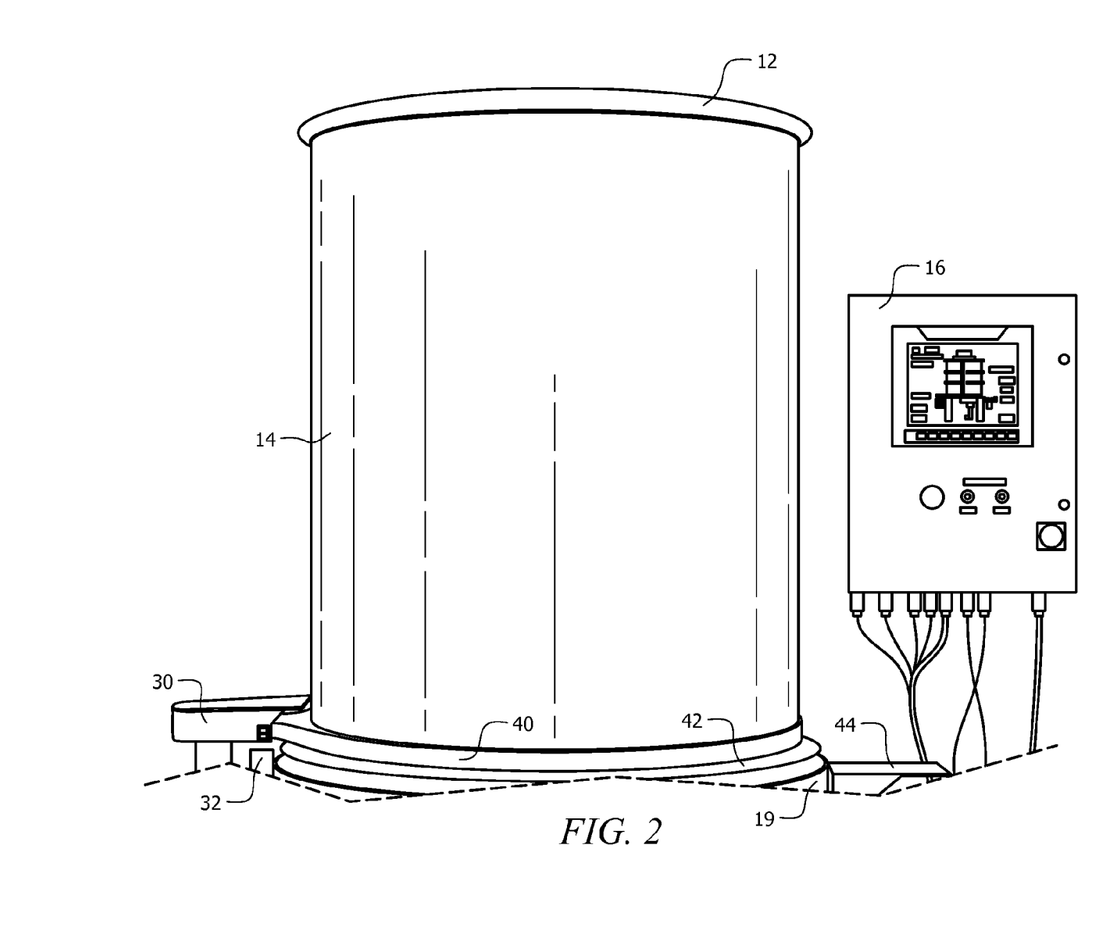
FIG. 2 is an upper portion—depicting primarily a hopper and control panel—as used in an apparatus for dispensing an additive into a base material.
Figure 3:
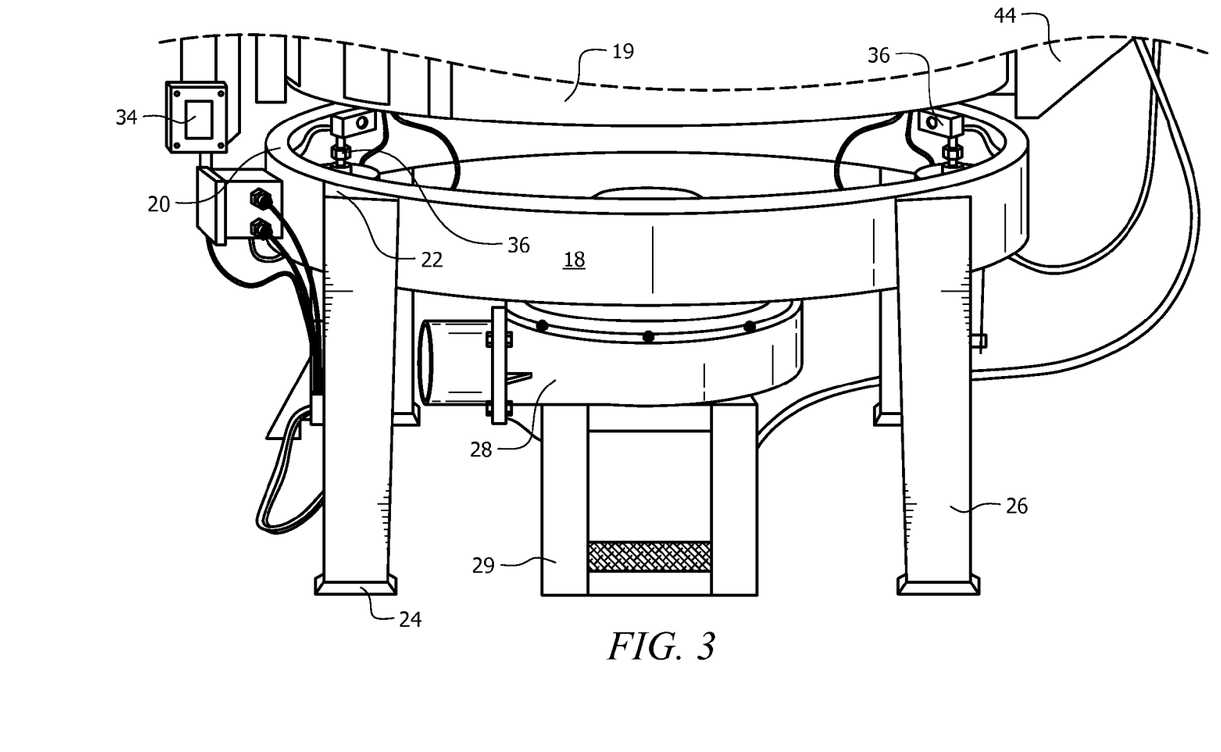
FIG. 3 depicts a lower portion—depicting primarily the support, stand ring, load cells, and dispenser—as used in an apparatus for dispensing an additive into a base material.
Figure 4:
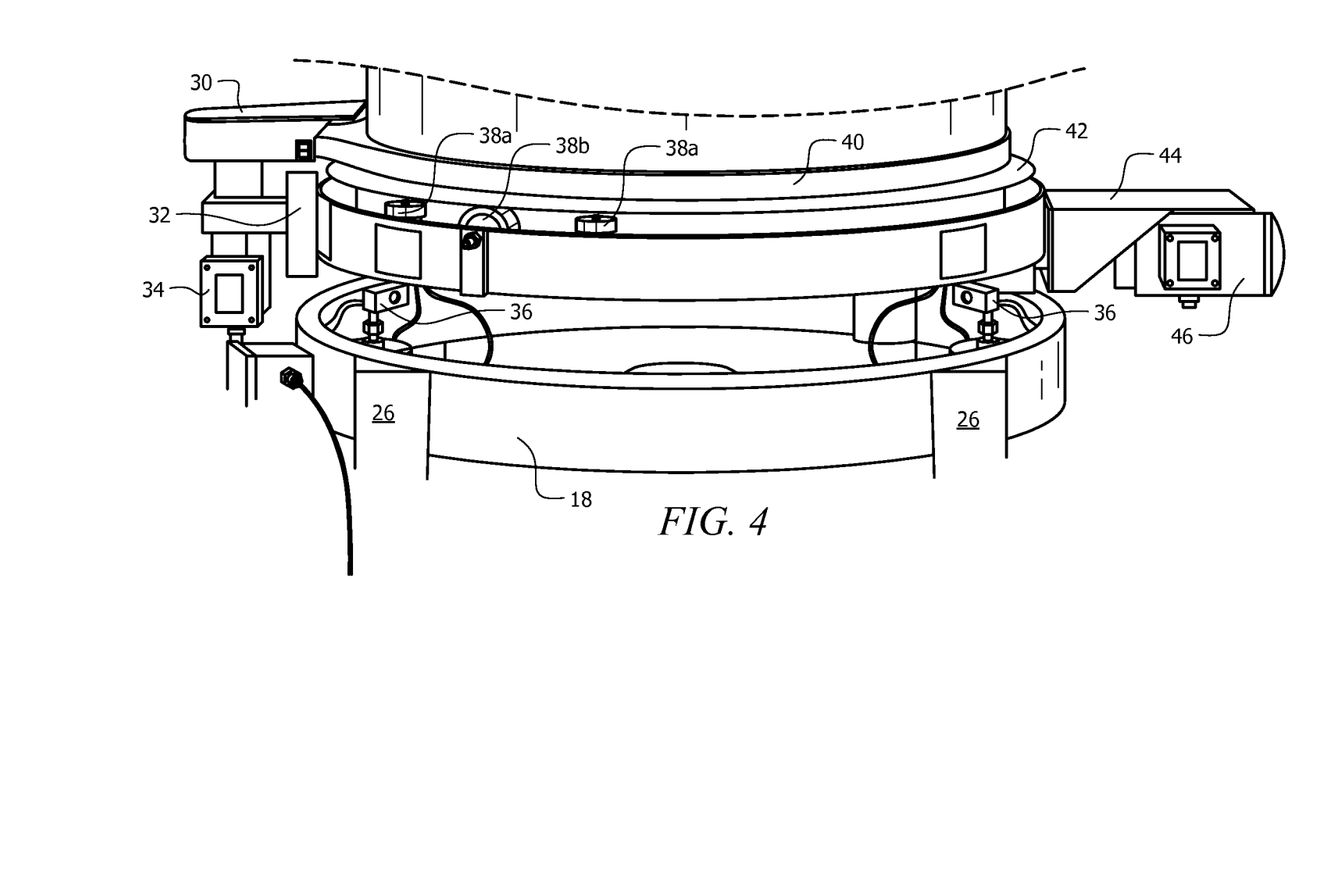
FIG. 4 depicts a middle portion—depicting primarily a base ring with rollers, relationship between the middle portion and lower portion, relationship between the middle portion and the upper portion, and various motors for operation—as used in an apparatus for dispensing an additive into a base material.
Figure 5:
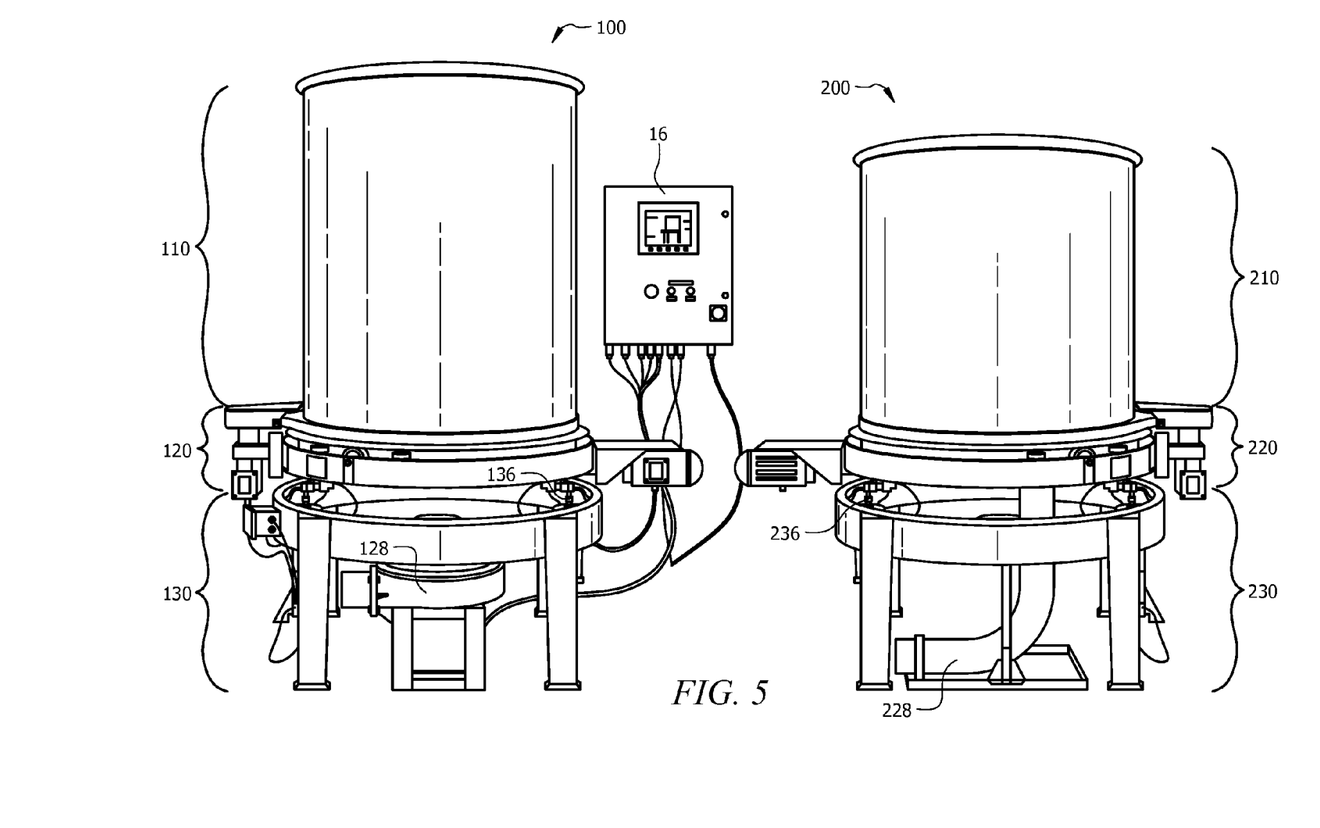
FIG. 5 depicts two embodiments of the current invention, showing differing sizes and components, as may be contemplated by the current invention.
Figure 6A:
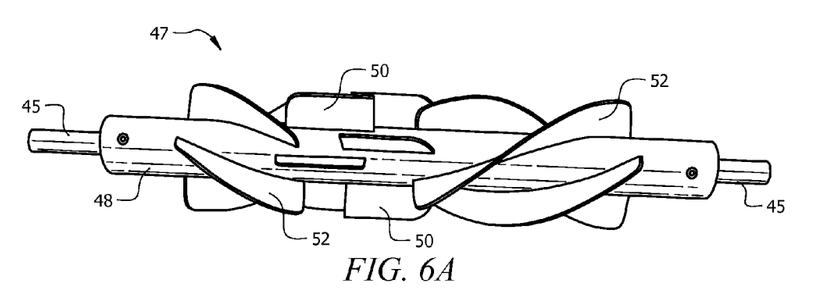
FIG. 6A is a front view of a rake as used in an apparatus for dispensing an additive into a base material.
Figure 6B:
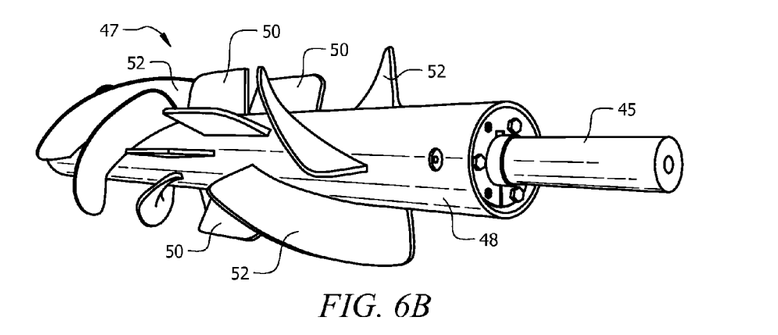
FIG. 6B is a perspective view of the rake of FIG. 6A.
Figure 6C:
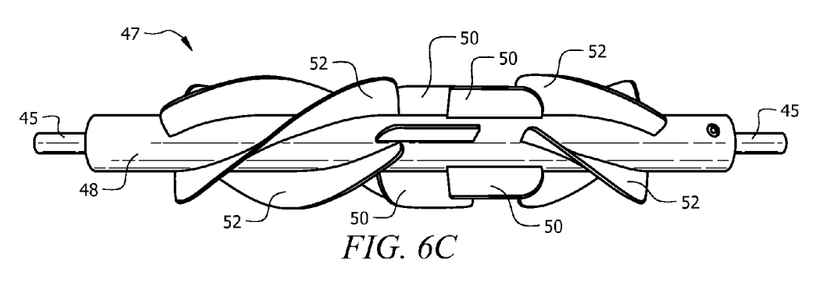
FIG. 6C is a front view of the rake of FIG. 6A with a different rotational position.
Figure 8:
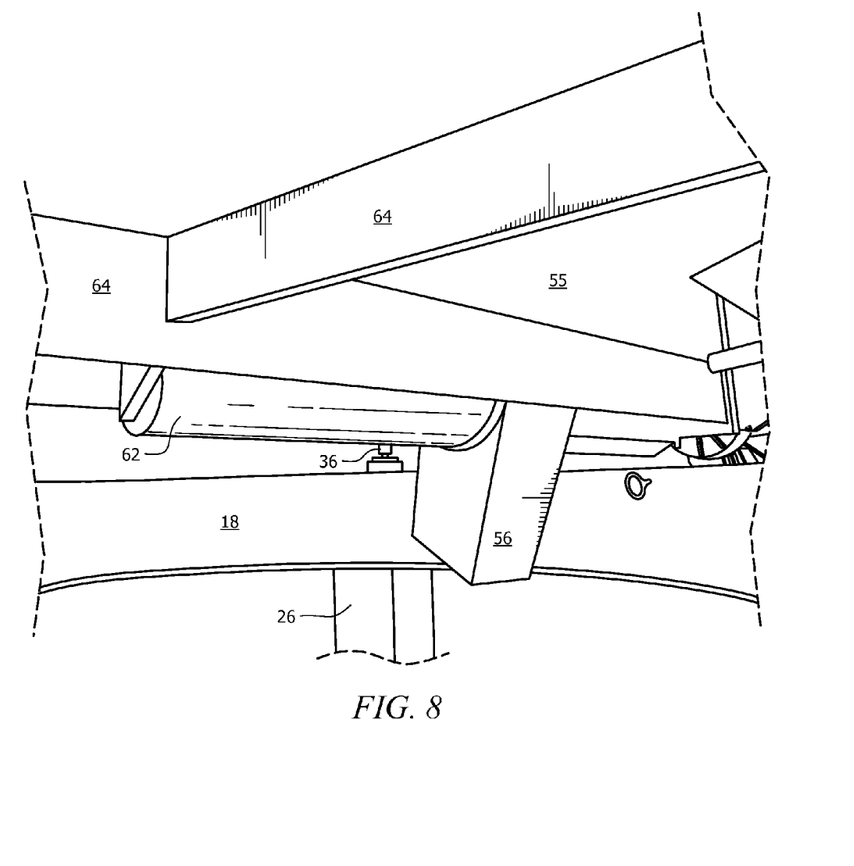
FIG. 8 is a lower perspective view of a middle portion of an apparatus for dispensing an additive into a base material. This view shows the lower portion of the rake housing and the chute or funnel where the additive exits the section of the apparatus that is supported by load cells (weight measured by load cells). The delivery system would be positioned under this chute.
Figure 9:
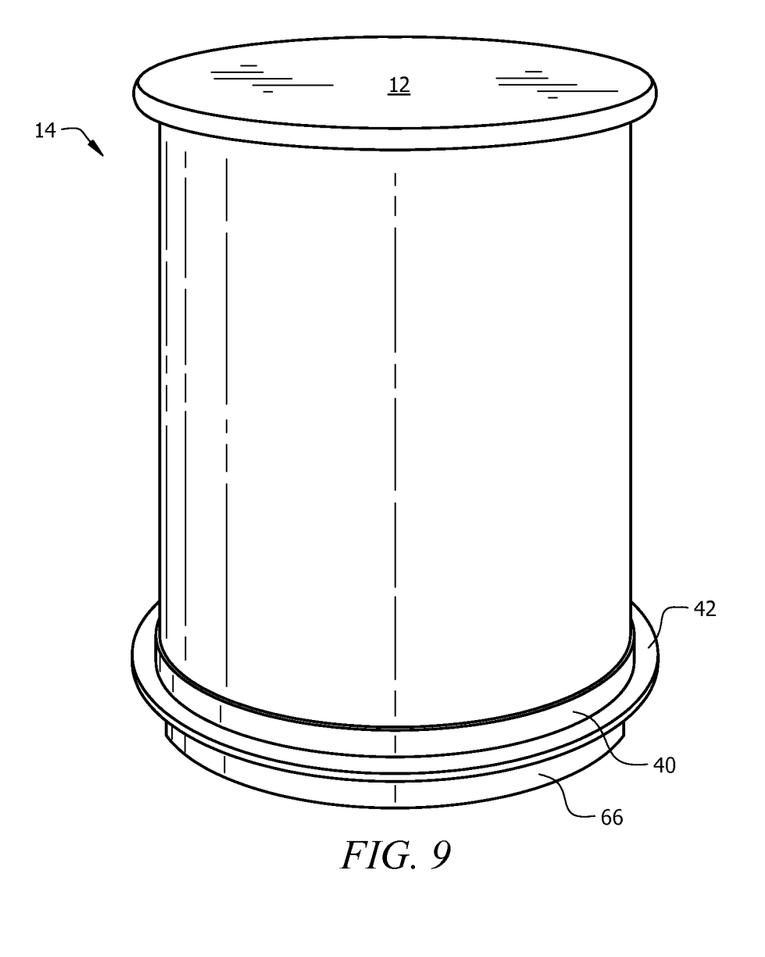
FIG. 9 is an exterior perspective view of a hopper as used in an apparatus for dispensing an additive into a base material.

Briefly, an embodiment of the apparatus is depicted in FIG. 1 and is generally denoted by the reference numeral 10. A top portion of apparatus 10 (primarily showing hopper ring 12, hopper 14 and control panel 16) is depicted in FIG. 2. A bottom portion of apparatus 10 (primarily showing the details of the support structure of apparatus 10, specifically hopper 14) is shown in FIG. 3. A middle portion of apparatus 10 (primarily showing load cells 36, various means of powering and controlling apparatus 10, various means of metering fibrous material from apparatus 10, and relationships among the top, middle, and bottom portions of apparatus 10) is shown in FIG. 4. FIG. 5 shows two related embodiments 100, 200 of the current invention that can be coupled to a single control panel and controlled simultaneously for a patterned distribution of an additive (e.g., fibrous) material contained within each apparatus 100, 200. Rake 47 is seen in FIGS. 6A-6C at different angles and in different positions. The middle portion of apparatus 10 is seen in FIGS. 7A-7D from various viewpoints that focus on the disposition of rake 47. FIG. 8 shows the positioning of exit chute 56 extending below the middle portion of apparatus 10 into the lower portion of apparatus 10. FIG. 9 depicts the general exterior structure of hopper 14 with hollow interior (not seen).

FIG. 1 depicts the general configuration of an embodiment 10 of the current invention. Apparatus 10 includes an upper portion, a middle portion, and a lower portion. The upper portion of apparatus 10 rests securely atop the middle portion of apparatus 10. The middle portion of apparatus 10 rests securely atop the lower portion of apparatus 10. The lower portion of apparatus 10 has a plurality of leg 26, each having bottom leg plate 24, that rest securely on the ground on which apparatus 10 is positioned. Apparatus 10 is powered and controlled by an array of mechanisms.

Each apparatus 10 contains rotating hopper 14 adapted to contain fiber and rake 47 for capturing the fiber and distilling it into another container or device. Hopper 14 contains fiber and rotates, for example in a counterclockwise direction. Thus, the fiber contained therein rotates with the hopper 14.

Each of these aspects and portions of apparatus 10 will become clearer as this specification continues.

Referring to FIG. 2, the upper portion of apparatus 10 includes hopper 14, top hopper ring 12 forming the top edge of hopper 14, belt ring 40 near the bottom of hopper, and support ring 42 positioned on top of hopper rollers 38 when in use.

Hopper 14 is typically cylindrical or similarly shaped with an impermeable external shell/wall that defines the outer spatial boundaries of hopper 14. Hopper 14 has an open bottom and an open or closable top, depending on the needs of the user. The interior of hopper 14 is substantially hollow and adapted to receive additive, such as fibrous material containing discrete, randomly-oriented fibers and the like. Hopper 14 may be formed of any suitable material, for example 0.090 rolled sheet aluminum, and has a predetermined diameter with a size that is dependent on the needs of the user. These needs may include a variety of criteria, for example including, but not limited to, amount of fiber to be distributed, spatial allowability for apparatus 10, etc. Typically, the inner diameters of top hopper ring 12 and bottom belt ring 40 are substantially similar, such that the exterior shell of hopper 14 is substantially vertical, but angled walls and inverted frusto-conically shaped hoppers are contemplated as well to increase space within the hollow interior of hopper 14.

As seen in FIGS. 2 and 9, the open bottom of hopper 14 can include three (3) distinct parts: belt ring 40, support ring 42, and bottom edge 66. Belt ring 40 is adapted to receive a pulley belt (not seen) to facilitate the rotation of hopper 14. Support ring 42 supports the substantial entirety (other than bottom edge 66) of hopper 14 when apparatus 10 is assembled. As will be discussed in further detail below, the bottom surface of support ring 42 non-fixedly sits on top of vertical rollers 38b, which rotate about a horizontal line of axis. Thus, support ring 42 is positioned substantially horizontally, so that as vertical rollers 38b rotate, a horizontal force is applied to support ring 42 to rotate hopper 14 around a vertical line of axis.

Bottom edge 66 extends vertically downwardly in relation to support ring 42. Bottom edge 66 has a length suitable that support ring 42 is able to rest on top of vertical rollers 38b, when assembled, without hindrance of bottom edge 66 resting on base 55. When apparatus 10 is assembled, horizontal rollers 38a, which rotate about a vertical line of axis, non-fixedly contact the outer surface of bottom edge 66. Thus, as horizontal rollers 38a rotate, a horizontal force is applied to bottom edge 66 to rotate hopper 14 around the vertical line of axis. The current invention contemplates that the lower aspect of hopper 14 (e.g., in this embodiment including belt ring 40, support ring 42, and bottom edge 66) is structured to contact a rotation mechanism that applies a horizontal force to hopper 14 to rotate hopper 14 around a vertical line of axis.

Alternatively, horizontal rollers 38a and vertical rollers 38b can be idler gears that do not drive the rotation of hopper 14. Rather, the rotation would be driven by belt ring 40 and pulley system (not seen) within pulley cover 30, as will be discussed later. This pulley and belt system would drive rotation of hopper 14, while horizontal rollers 38a and vertical rollers 38b would provide stability to hopper 14 during rotation. In this case, any known method of stabilizing hopper 14, such as a snugger fit within base ring 19, is contemplated.

FIG. 2 further shows control panel 16, though control panel 16 can be positioned anywhere of convenience for the user. Control panel 16 is electrically coupled to apparatus 10, specifically at least to load cells 36, which ensure even distribution of the fibrous material. Control panel 16 is used to monitor or depict the fiber metered or captured from hopper 14. Further, a plurality of apparatuses can be coupled to one (1) control panel 16, as depicted in FIG. 5.

FIG. 2 further shows various other power, control, and metering mechanisms that will be discussed as this specification continues.

FIG. 3 depicts a lower portion of apparatus 10, where the primary function of the lower portion is to support the weight of the middle and upper portions of apparatus 10 and provide an open space for the positioning of a structure that can receive and dispense or distribute the metered fiber into a receptacle (not shown), while venting any exhaust air to prevent overheating.

Legs 26 of apparatus 10 include bottom leg plates 24 that contact the surface on which apparatus 10 is positioned. Bottom leg plates 24 may serve to prevent damage to the underlying surface, provide a higher friction coefficient so as to prevent apparatus 10 from moving, among other functions. Legs 26 should be formed of a resilient material that is capable of supporting a large amount of weight. Stand ring 18 is disposed at or near the top of legs 26 at top leg plate 22 and is coupled to each of legs 26 such that the diameter of stand ring 18 is horizontally disposed. As such, stand ring 18 remains elevated above the surface on which apparatus 18 is positioned. Thus, legs 26 and stand ring 18 form an open and empty space therewithin.

Various machinery or structures can be placed within this space formed by legs 24 and stand ring 18. Said machinery or structures would thus also be positioned directly beneath hopper 14, base ring 19, and base 55. For example, as seen in FIG. 3, optional blower 28 can be disposed within the empty space, along with possibly blower stand or exhaust vent 29. Blower 28 would receive fiber that has been metered, filtered, and funneled from hopper 14 and base 55. Upon receipt, blower 28 would output the fiber into any receptacle, for example a vat of mixing concrete, an empty container for storage, etc. Optionally, blower 28 may rest on a blower stand 29 or be coupled to an exhaust vent for better or more efficient positioning of blower 28. The current invention contemplates any output or delivery system of the metered fiber, and blower 28 is one option. Alternatively, the fiber additive can be dispensed gravimetrically or directly onto a belt or into a mixing chamber. The fiber or additive can be outputted via the use of a pneumatic transfer unit that requires the use of compressed air. Any known methodologies for this purpose can be used.

Still referring to FIG. 3, another mechanism of the lower portion of apparatus 10 is the connection of stand ring 18 and base ring 19 through one or more load cells 36 that electronically (e.g., via transducer, control panel or computer means) measure the initial weight of fiber contained within hopper 14 and monitor the weight of the fiber as the process is initiated and continues through completion. Thus, load cells 36 can monitor the amount of fiber being dispensed from hopper 14. Load cells 36 can then automatically send an electrical signal to hopper 14 to either increase or decrease speed of rotation in order to meter the fiber and maintain a consistent flow of fiber.

Load cells 36 should support at least a portion of the weight of the structures above it, for example hopper 14, fibrous material contained within hopper 14, base ring 19, etc.

In an embodiment, load cells 36 are transducers that convert a force into an electrical signal. Thus, a downward force of the weight of the fibrous material is sensed by and deforms a strain gauge (not seen), which, in turn, measures the strain or deformation as an electrical signal, since the strain alters the effective electrical resistance of the wire. Thus, since load cells 36 are electrically coupled to and in communication with control panel 16, load cells 36 can fire an electrical signal to control panel 16, and control panel 16 can increase or decrease speed of rotation of hopper 14 and rotation of rake 47 accordingly. Any suitable load cell with any suitable configuration may be utilized, for example hydraulic, pneumatic, strain gauge, piezoelectric, vibrating wire, and capacitor load cells, among others that may be known in the art to convert a mechanical strain into an electrical signal.

In an embodiment, four (4) load cells 36 are utilized in underlying relation to hopper 14 and being a connection point between base ring 19 and stand ring 18. Thus, load cells 36 can accurately and precisely sense mechanical stress associated with the weight of the fibrous material. Load cells 36 can then convert this mechanical stress into an electrical signal that is fired to control panel 16, which can, in turn, normalize the readings of the mechanical stress and adjust operation of apparatus 10 accordingly. A suitable software application would be installed onto control panel 16 for performing this function.

It is alternatively contemplated that the current invention can function in volumetric mode, or without load cells 36. In this case, rotation of hopper 14 can be set at a predetermined speed, so that rake 47 captures fiber at a consistent rate. Thus, hopper 14 can meter the fiber without assistance of load cells 36. A PLC control panel may be included in this embodiment to set the speed of rotation and time of function, and to monitor the amount of fiber being captured.

FIG. 3 further shows various power, control, and metering mechanisms that will be discussed as this specification continues. Top and bottom ring stand plates 20 may be used for connections to these electrical mechanisms, if needed.

FIG. 4 depicts a middle portion of apparatus 10. Base ring 19 has a diameter that is slightly larger than the diameter of hopper 14. Thus, bottom edge 66 of hopper 14 can be positioned within base ring 19 when support ring 42 is disposed on top of vertical rollers 38b. Horizontal rollers 38a also then can contact bottom edge 66 to facilitate rotation of hopper 14. The structure and functionality of rollers 38a, 38b in relation to base ring 19 and base 55 will become clearer as this specification continues.

Apparatus 10 may further include an array of mechanisms for powering and controlling apparatus 10, in particular hopper 14 and rake 47, thus also metering the fibrous material contained therein. Pulley cover 30 is associated with belt ring 40 and contains a pulley system (not seen) facilitates rotation of hopper 14. Any suitable belt and pulley system is contemplated by the current invention. Further, the pulley system is electrically or mechanically coupled to hopper drive motor 34 positioned on motor mount 32. Typically, a gear reduction system may be needed between the output shaft of the pulley system and the output shaft of hopper drive motor 34 to increase or decrease speed of rotation of the gears within the pulley system, thus also increasing or decreasing speed of rotation of hopper 14.

If the pulley and belt system is the primary force causing rotation of hopper 14, horizontal rollers 38a and vertical rollers 38b can be idler gears that stabilize hopper 14 during rotation, as previously discussed.

Rake motor mount 44 and corresponding rake motor 46 are electrically or mechanically coupled to rake 47, which has a structure and function that will become apparent as this specification continues. Rake motor 46 is capable of controlling the activation, deactivation, and speed of rotation of rake 47. Any conventional motor suitable for this purpose is envisioned by the current invention.

FIG. 5 is an exterior view of two embodiments 100, 200 of the current invention showing that the current invention contemplates varying sizes with varying components. Each of embodiments 100, 200 have upper portion 110, 210, middle portion 120, 220, and lower portion 130, 230, respectively, that correspond and are analogous to one another. Differences may exist, though, depending on the needs of the user, for example with regards to the output mechanism of the filtered and funneled fibrous material. Whereas embodiment 100 includes blower 128 elevated off of the ground, embodiment 200 can include blower 228 closer to the surface on which embodiment 200 is positioned. Both embodiments 100, 200 would have corresponding load cells 136, 236 to ensure even distribution of the additives contained within the hopper of each embodiment 100, 200.

FIGS. 6A-6C, 7A-7D, and 8 illustrate the internal mechanisms of apparatus 10. FIGS. 6A-6C illustrate a rake generally denoted by the reference numeral 47. Rake 47 includes rake shaft 45 that facilitates the fastening of rake 47 to and underneath base 55 (see FIG. 8), for example by fitting into a notched that secures rake 47 to base 55. Rake 47 further includes base shaft 48 disposed in surrounding relation to rake shaft 45 as seen in FIGS. 6A-6C, such that a portion of rake shaft 45 extends out of each end of base shaft 48 for fastening to base 55.

Extending outwardly from base shaft 48 are an array of planar flanges 50 and curved flanges 52. Planar flanges 50 are located nearest the midpoint of rake 47 and extend radially from base shaft 48. Curved flanges 52 are located nearest the end points of base shaft 48, are slightly concave towards the midpoint of rake 47, and are angled so that the additive (e.g., fibrous) material is directed towards planar flanges 50 and exit chute 56 when rake 47 is in rotation.

Rake 47 is disposed underneath and within base 55 at or near the lower boundary of hopper 14, such that all or at least a portion of rake 47 is disposed within the interior of hopper 14. Rake 47 is capable (i.e., manually, mechanically, or automatically) of capturing the fiber from the bottom of hopper 14 and filtering or directing the fiber into exit chute 56 for the delivery system. Rake 47 contains a rigid, cylindrical base shaft 48 surrounded by a plurality of teeth or flanges 50, 52. The teeth or flanges 50, 52 of rake 47 capture fiber of particular length, weight, or other physical characteristic and direct those desired fiber into the delivery system. Structuring rake 47 in this manner further prevents fiber from binding, bridging, clinging, or "balling-up" during the dispensing process.

Figure 7A:
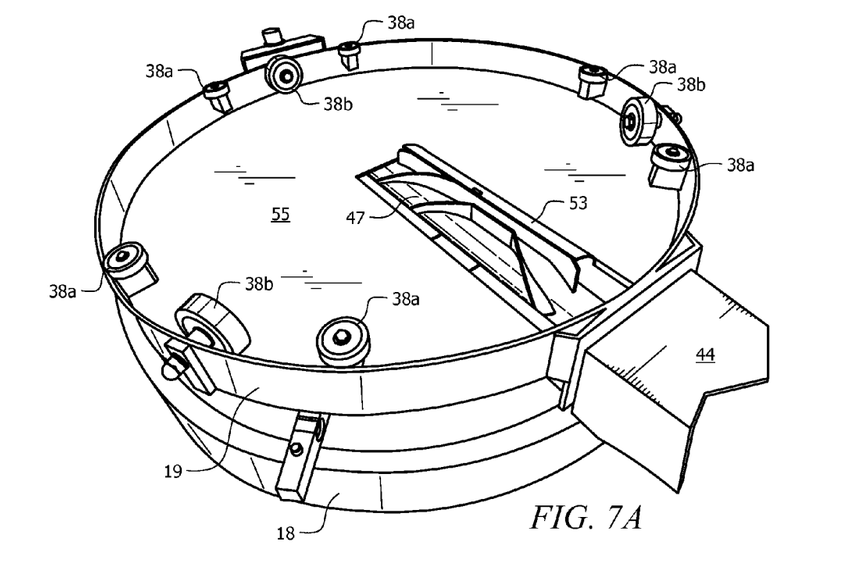
FIG. 7A is a top perspective view of a middle portion of an apparatus for dispensing an additive into a base material, where the top portion (primarily the hopper) has been removed for clarity.
Figure 10:
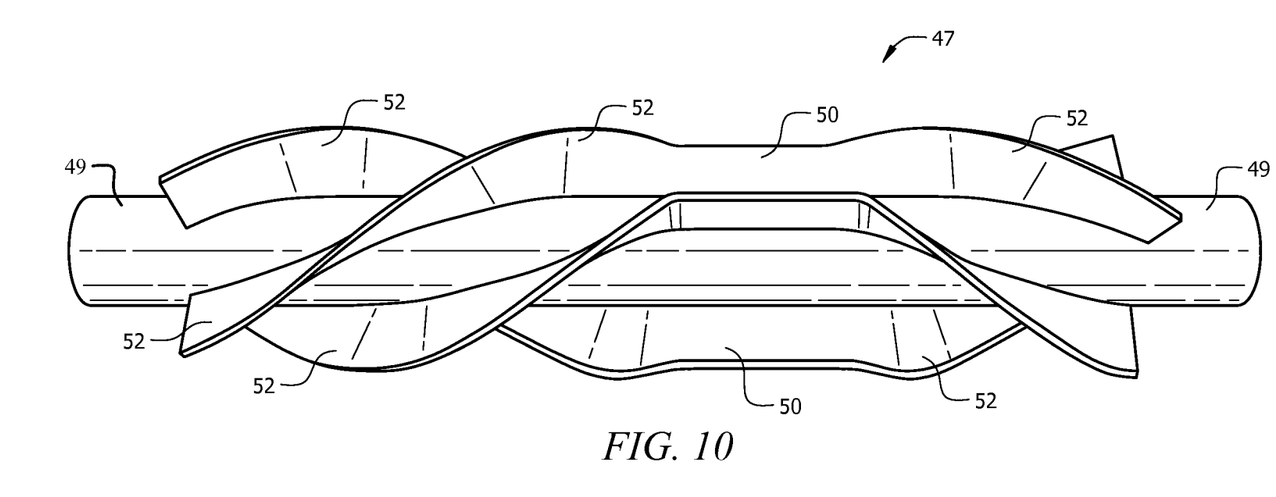
FIG. 10 is a front view of an alternative embodiment of a rake as used in an apparatus for dispensing an additive into a base material.

Alternatively, as seen in FIGS. 7A and 10, planar flanges 50 and curved flanges 52 may be integrated with each other to eliminate any space therebetween. This alternative configuration may provide less clogging of the additive and thus streamline the filtering process.

Figure 7B:
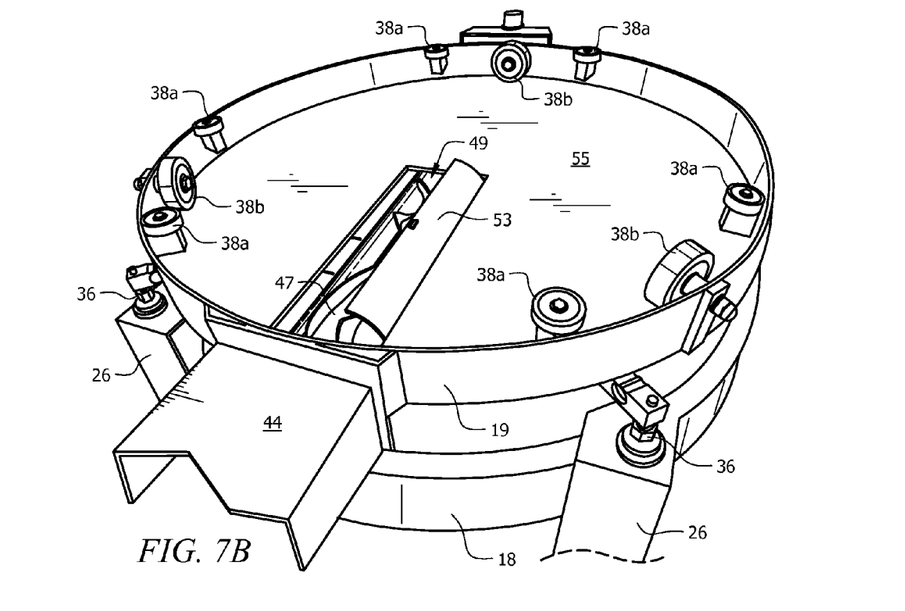
FIG. 7B is a perspective view of the middle portion of FIG. 7A from a different position.
Figure 7C:
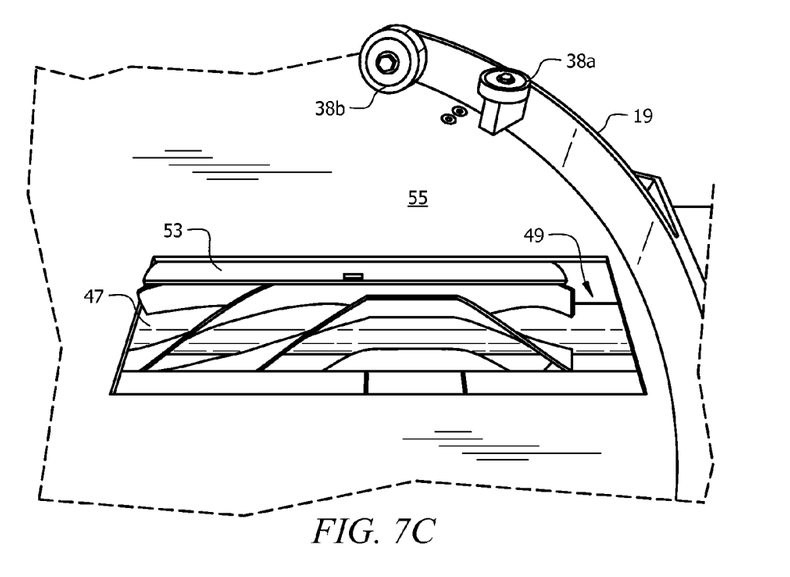
FIG. 7C is a close-up view of a rake within a middle portion of an apparatus for dispensing an additive into a base material.

In an embodiment, as seen in FIGS. 7A-7C, rake 47 has a length roughly equal to the radius of base 55 with teeth or flanges 50, 52 arranged in manner that directs the fiber towards exit chute 56 underneath base 55. Exit chute 56 is located near the midpoint of the total length of rake 47. Therefore, rake 47 utilizes planar flanges 50 and curved flanges 52. Planar flanges 50 are located nearest the midpoint of rake 47 and extend radially from base shaft 48. Curved flanges 52 are located nearest the end points of base shaft 48, are slightly concave towards the midpoint of rake 47, and are angled so that the fiber is directed towards planar flanges 50 and exit chute 56.

FIGS. 7A-7C are different views of the top surface of base 55 with hopper 14 removed. Base 55 has a top surface, which is seen in FIGS. 7A-7C, and a bottom surface, which is partially seen in FIG. 7D. The top surface of base 55 has a periphery defined by base ring 19. Horizontal rollers 38a and vertical rollers 38b can be positioned along the periphery of base 55. As discussed, horizontal rollers 38a and vertical rollers 38b may be active, driving gears, such that one or both rollers 38a, 38b drive the rotation of hopper 14 about its vertical line of axis. Alternatively, horizontal rollers 38a and vertical rollers 38b may be idler gears, such that one or both rollers 38a, 38b maintain the stability of rotation of hopper 14 about its vertical line of axis.

Further, horizontal rollers 38a and vertical rollers 38b may be positioned in sets of three (3) with alternating rollers for additional stability. As seen in FIGS. 7A and 7B, three (3) sets of three (3) rollers 38a, 38b are disposed on or along base ring 19 along the periphery of base 55. When apparatus 10 is assembled, support ring 42 of hopper 14 rests on top of vertical rollers 38b, such that horizontal rollers 38a contact bottom edge 66. Horizontal rollers 38a are positioned on each side of each vertical roller 38b for stability since vertical rollers 38b supports the weight of hopper 14 when assembled. Each set of three (3) rollers 38a, 38b are positioned substantially equidistant from one another along the periphery of base 55. Any number of sets may be present, though three (3) sets are shown in FIGS. 7A and 7B.

Still referring to FIGS. 7A-7C, window 49 is formed within base 55. Window 49 can have any dimensions but typically has an end at an edge of base 55 and extends toward the center of base 55. Window 49 should lead through the top and bottom surface of base 55, so that there is a line of sight from an area above base 55 to an area below base 55.

Rake 47 is secured beneath base 55, such that rake 47 is positioned substantially within window 49, and rotatable about its longitudinal axis within window 49. As rake 47 rotates, flanges 50, 52 extend into the interior of hopper 14 at the top of its rotation.

Window 49 may further have guide or deflecting plate 53 positioned along an edge of the longitudinal axis of window 49 and extending in overlying relation to at least a portion of window 49. A purpose of deflecting plate 53 is to serve as a backstop for fiber that is directed into contact with rake 47 via window 49. Deflecting plate 53 also prevents the weight of additive in hopper 14 from bearing down on rake 47. As hopper 14 and associated base 55 rotate, fiber is directed toward window 49 and rake 47. Fiber may contact deflecting plate 53 and be additionally directed into window 49. Further, when rake 47 rotates, some fiber may be expelled or driven out of window 49 by flanges 50, 52. Deflecting plate 53 maintains the fiber within window 49 for funneling through rake 47.

As seen in FIGS. 7A-7C, deflecting plate 53 can be curved in a manner that would maximize guidance of fiber toward rake 47. In the case of this embodiment, hopper 14 would rotate in a counterclockwise direction, so that fiber is directed toward the opening between deflecting plate 53 and window 49 allowing the additive to be fed toward rotating rake 47 in a controlled manner. However, it is contemplated that deflecting plate 53 can be positioned along another edge of window 49, and hopper 14 would rotate in the corresponding direction.

As can be seen in FIG. 7B, load cells 36 support base ring 19, as previously discussed, and are a means to ensure even distribution of the fiber within hopper 14. Load cells 36 measure the amount of additive in the weighed section of apparatus 10. The weighed section includes hopper 14, base 55, and hopper drive motor 34, and other associated parts. Keeping track of the loss in weight of additive in hopper 14 ensures an even and controlled delivery rate of the additive.

Figure 7D:
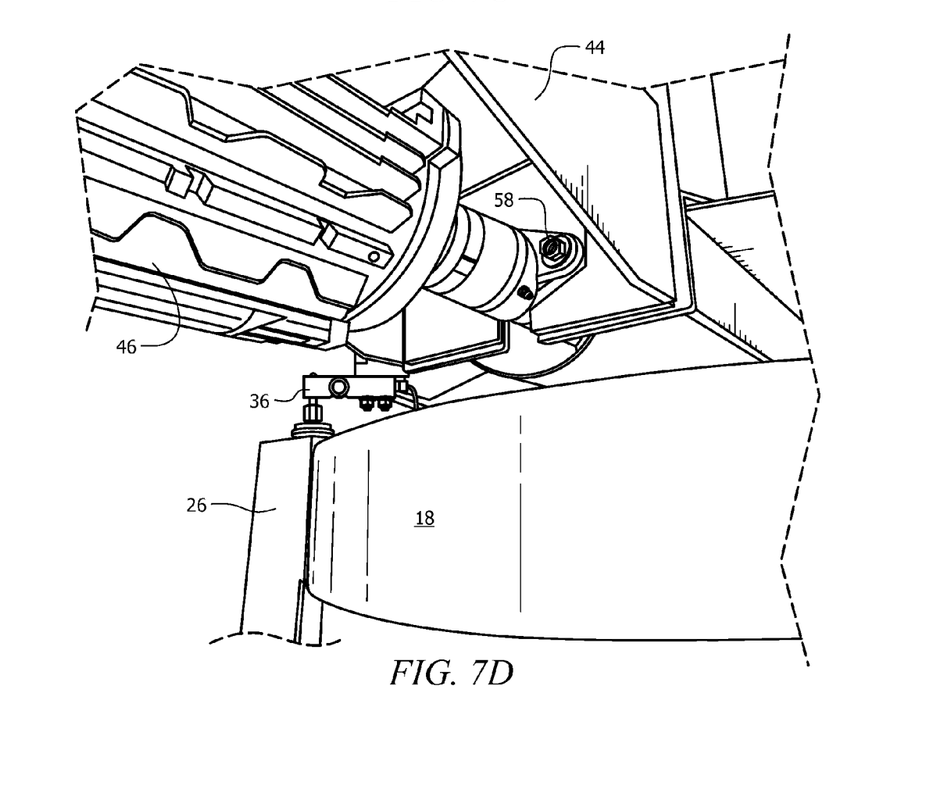
FIG. 7D is a lower perspective view of a middle portion of an apparatus for dispensing an additive into a base material, where the view shows the fastening of the rake and rake housing to the middle portion of the apparatus and the coupling of the rake motor to the rake.

FIG. 7D shows an area adjacent to and beneath base 55 and rake motor mount 44 to further illustrate rake motor 46. Any known means of driving the rotation of rake 47 is envisioned. In an embodiment, seen in FIG. 7D, rake motor 47 is bolted 58 or otherwise fastened to rake motor mount 44 and is electrically and mechanically coupled to rake 47, which is exposed within window 49, as discussed. Rake motor 46 can drive the rotation of rake 47 at any feasible speed. For example, a speed of 1700 rpm is envisioned for funneling fiber or other additive. Speed can be increased or decreased in order to increase or decrease output of the additive.

FIG. 8 is another view beneath base 55. Support frames 64 can be positioned beneath base 55 for additional bracing. Rake housing 62 can be positioned in surrounding relation to rake 47 or rake cover 56. Rake housing 62 would have an open top (not shown) that exposes rake 47 within window 49. Rake housing 62 can also have an opening that leads to exit chute 56. Functionally, fiber from hopper 14 would contact rake 47 having flanges 50, 52 that direct the fiber to exit chute 56 beneath base 55. Exit chute 56 directs fiber into any type of known collector or output mechanism (e.g., blower 28, etc.).

Structurally and functionally, the current invention is significantly less complex (i.e., easier to use, easier to manufacture, etc.) and more accurate than fiber dispensers taught in the conventional art. For example, structurally there are a relatively few number of moving parts, and functionally rake 47 does not allow the lightweight fiber to bind, bridge, cling, or "ball-up" during the dispensing operation. Further, load cells 36 allow an even distribution of fiber or other additive into the base material.

Although fibrous material and specifically fiber has been discussed in relation to the current invention, it is contemplated that any suitable material needed for even, controlled, and automated distribution into a base material can be used in substantially the same manner as discussed herein. Thus, base material also has been discussed in relation to concrete and asphalt, though it is envisioned that any material to which an additive can be added to supplement the base material can be utilized.

GLOSSARY OF CLAIM TERMS

Additive: This term is used herein to refer to any suitable supplementary material needed for even and automated distribution into a base material. An example of an additive is fibrous material.

Base material: This term is used herein to refer to any foundation or root material whose characteristics can be enhanced by the addition of an additive. An example of a base material is cement or asphalt.

Curved flange: This term is used herein to refer to a rib or projecting edge near the endpoints of a rake, where the curved flange facilitates the filtering of fiber or other additive by driving the fiber downward and toward the planar flanges near the midpoint of the rake.

Delivery system: This term is used herein to refer to any device that outputs or applies the filtered fiber or other additive to another system.

Dispenser: This term is used herein to refer to a machine or device that is used to distribute other items or materials. A fiber "dispenser" distributes fiber from a source (e.g., a hopper) to an end destination (e.g., funnel, delivery system, concrete mix, etc.).

Even distribution: This term is used herein to refer to a consistent, regular, stable dispersal of the additive to the delivery system.

Exit chute: This term is used herein to refer to a structure that contains a passage or avenue for a fluid or flowing substance. For example, fiber can enter an "exit chute" that leads to a delivery system.

Fibrous material: This term is used herein to refer to continuous or discrete elongates pieces that are formed from filamentous material, such as glass or other synthetic or natural material. Fiber can be blended into a concrete or asphalt mix to provide a number of advantages, as previously discussed.

Hopper: This term is used herein to refer to a hollow container for transport, blending, and/or storage of a fluid or other material. The hopper receives additives from the top and funnels it through an exit at the bottom of the hopper.

Load cell: This term is used herein to refer to a transducer that converts the force from the weight of the fiber within the hopper to an electrical signal that notifies the hopper whether to increase, decrease, or maintain speed of rotation.

Motor: This term is used herein to refer to any power source for the functioning of a device, such as the rake or hopper within the current invention.

Patterned distribution: This term is used herein to refer to a designed dispersal of the additive based on time and amount of the additive.

Planar flange: This term is used herein to refer to a substantially flat rib or projecting edge near the midpoint of a rake, where the planar flange facilitates the filtering of fiber or other additive by driving the fiber downward toward the delivery system.

Pulley and belt system: This term is used herein to refer to any known apparatus utilizing a pulley and belt to connect output shafts of the motor and pulley to rotate the hopper.

Rake: This term is used herein to refer to a device that has a plurality of components, for example possibly a row of teeth or plurality of flanges, that are capable of filtering and directing fiber out of a hopper.

Rotatably received: This term is used herein to refer to the stabilization of the hopper in the base in a manner that allows the hopper to rotate about its vertical line of axis.

Securely rotate: This term is used herein to refer to the rotation of the hopper about its vertical line of axis in a manner that permits the hopper to rotate with minimal bending or swaying, such that the hopper remains substantially vertically oriented during rotation.

Selectively filter: This term is used herein to refer to sorting, sifting, isolating, or otherwise moving a particular fiber from a larger amount of fiber based on any characteristic of the fiber. For example, fiber can be "selectively filtered", or moved, from the hopper to the funnel based on the length and/or weight of the fiber. This selective filtering would function similarly with other materials as well.

Substantially hollow: This term is used herein to refer to the amount of vacancy within a hopper, drum, or other reservoir to the extent that the addition of any structures within that hopper, drum, or reservoir does not effectively hinder the overall function of the apparatus (i.e., dispenser).

Substantially impermeable: This term is used herein to refer to a material that does not readily or easily allow the passage of another fluid or solid to the extent that any allowance of passage of another fluid or solid does not effectively hinder the overall function of the apparatus (i.e., dispenser).

The advantages set forth above, and those made apparent from the foregoing disclosure, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A dispenser for even or patterned distribution of an additive into a base material, comprising:
   a hopper having an impermeable outer wall and a substantially hollow interior for receiving said additive, said hopper having an open bottom with a predetermined diameter;
   a base having a shape similar to the shape of said open bottom of said hopper and being concentric with said open bottom of said hopper, said hopper having a bottom edge that is rotatably received by said base such that said hopper can securely rotate about a vertical line of axis;
   a window with predetermined dimensions formed within said base;
   an elongate, rotating rake positioned and secured within said window, said rake having a plurality of flanges that selectively filter said additive and guide said additive through said window,
   said plurality of flanges including planar flanges positioned nearest a midpoint of said elongate rake;
   said plurality of flanges further including curved flanges positioned nearest each end of said elongate rake;
   said curved flanges being angled to urge said additive toward said planar flanges and to urge said additive downwardly through said window of said base, said planar flanges urging said additive downwardly through said window of said base;
   a support frame positioned under said base for supporting said base and said hopper;
   a delivery system positioned at least partially in underlying relation to said window, said delivery system receiving said additive as said additive exits downwardly through said window; and
   a power source coupled to a motor for powering said motor.

2. A dispenser as in claim 1, further comprising:
   said planar flanges and said curved flanges being integrated with one another to eliminate any space therebetween.

3. A dispenser as in claim 1, further comprising:
   a load cell coupled to said base for measuring the weight of said additive remaining in said hopper as said additive exits said hopper into said delivery system, said load cell providing feedback to a controller to control rotation of said hopper and rotation of said rake to increase or decrease output of said additive through said window.

4. A dispenser as in claim 1, further comprising:
   said delivery system including an exit chute in communication with said window, such that said additive exiting said window is directed into said exit chute.

5. A dispenser as in claim 4, further comprising:
   said delivery system further including a blower in communication with said exit chute, such that said additive exiting said exit chute is directed into said blower for distribution into said base material.

6. A dispenser as in claim 1, further comprising:
   a deflecting plate positioned along a longitudinal edge of said window for guiding said additive to said rake and through said window.

7. A dispenser as in claim 1, further comprising:
   said base including a base ring along the periphery of said base, said base ring having a top edge that is higher than said bottom edge of said hopper when said base receives said hopper.

8. A dispenser as in claim 7, further comprising:
   a plurality of rollers positioned along an inner periphery of said base ring, said plurality of rollers further securing said hopper during rotation of said hopper.

9. A dispenser as in claim 8, further comprising:
   said plurality of rollers including a vertical roller and a horizontal roller, said vertical roller rotating about its horizontal line of axis, said horizontal roller rotating about its vertical line of axis.

10. A dispenser as in claim 9, further comprising:
    said horizontal roller including one (1) horizontal roller disposed on each side of one (1) vertical roller to form a set of three (3) rollers, wherein said set of rollers includes a plurality of sets of rollers positioned substantially equidistant from one another in multiple places along said inner periphery of said base ring.

11. A dispenser as in claim 9, further comprising:
a pulley and belt system coupled to and in communication with said hopper and said motor to facilitate the rotation of said hopper.

12. A dispenser as in claim 1, further comprising:
a control panel in electrical communication with said motor to control rotation of said hopper, a second motor to control rotation of said rake, or both.

13. A dispenser as in claim 1, further comprising:
said window having an end disposed at a peripheral edge of the base and extending toward a central point of said base, said window and said rake having a length similar to a radius of said base.

14. A dispenser as in claim 1, further comprising:
each of said plurality of flanges being disposed within said substantially hollow interior of said hopper when said each flange reaches an apex during rotation of said rake.

15. A dispenser for even or patterned distribution of an additive into a base material, comprising:
a hopper having an impermeable outer wall and a substantially hollow interior for receiving said additive, said hopper having an open bottom with a predetermined diameter;
a base having a shape similar to the shape of said open bottom of said hopper and being concentric with said open bottom of said hopper,
said hopper having a bottom edge that is rotatably received by said base such that said hopper can securely rotate about a vertical line of axis;
a window with predetermined dimensions formed within said base for the flow of said additive out of said hopper;
an elongate rake positioned and secured within said window, said rake having an array of flat and curved flanges that guide said additive through said window,
said flat flanges positioned nearest a midpoint of said elongate rake, said curved flanges positioned nearest each end of said elongate rake, said curved flanges being angled to urge said additive toward said flat flanges and to urge said additive downwardly through said window of said base, said flat flanges urging said additive downwardly through said window of said base;
a support frame positioned under said base for supporting said base and said hopper;
a delivery system positioned at least partially in underlying relation to said window, said delivery system receiving said additive as said additive exits downwardly through said window;
a power source coupled to a motor for powering said motor; and
a load cell coupled to said base for measuring the weight of said additive as said additive exits said hopper into said delivery system, said load cell providing feedback to a controller to control rotation of said hopper, rotation of said rake, or both to increase or decrease output of said additive through said window.

16. A dispenser as in claim 15, further comprising:
a plurality of rollers positioned along an inner periphery of said base, said plurality of rollers further securing said hopper during rotation of said hopper.

17. A dispenser as in claim 15, further comprising:
said controller including a control panel in electrical communication with said load cell and said motor to control rotation of said hopper.

18. A dispenser for even or patterned distribution of a fibrous material into cement or asphalt, comprising:
a hopper having an impermeable outer wall and a substantially hollow interior for receiving said fibrous material, said hopper having an open bottom with a predetermined diameter;
a base having a shape similar to the shape of said open bottom of said hopper and being concentric with said open bottom of said hopper,
a base ring disposed along the periphery of said base;
said hopper having a bottom edge that is rotatably received by said base such that said hopper can securely rotate about a vertical line of axis, said base ring having a top edge that is higher than said bottom edge of said hopper when said base receives said hopper;
a plurality of rollers positioned along an inner periphery of said base ring, said plurality of rollers including a vertical roller and a horizontal roller that further secure said hopper during rotation of said hopper, said vertical roller rotating about its horizontal line of axis, said horizontal roller rotating about its vertical line of axis;
a pulley and belt system coupled to and in communication with said hopper and a motor to facilitate the rotation of said hopper;
a window with predetermined dimensions formed within said base;
an elongate rake positioned and secured within said window, said rake having a plurality of flanges that guide said fibrous material through said window, said plurality of flanges including planar flanges positioned nearest a midpoint of said elongate rake, said plurality of flanges further including curved flanges positioned nearest each end of said elongate rake, said planar and curved flanges being integrated with one another, said curved flanges being angled to urge said fibrous material toward said planar flanges and to urge said fibrous material downwardly through said window of said base, said planar flanges urging said fibrous material downwardly through said window of said base,
a support frame positioned under said base for supporting said base and said hopper;
a delivery system positioned at least partially in underlying relation to said window, said delivery system including an exit chute that receives said fibrous material as said fibrous material exits downwardly through said window;
a power source coupled to said motor for powering said motor;
a load cell coupled to said base for measuring the weight of said additive remaining in said hopper as said additive exits said hopper into said delivery system, said load cell providing feedback to a control panel to control rotation of said hopper and rotation of said rake to increase or decrease output of said additive through said window.

* * * * *